Patented Feb. 2, 1926.

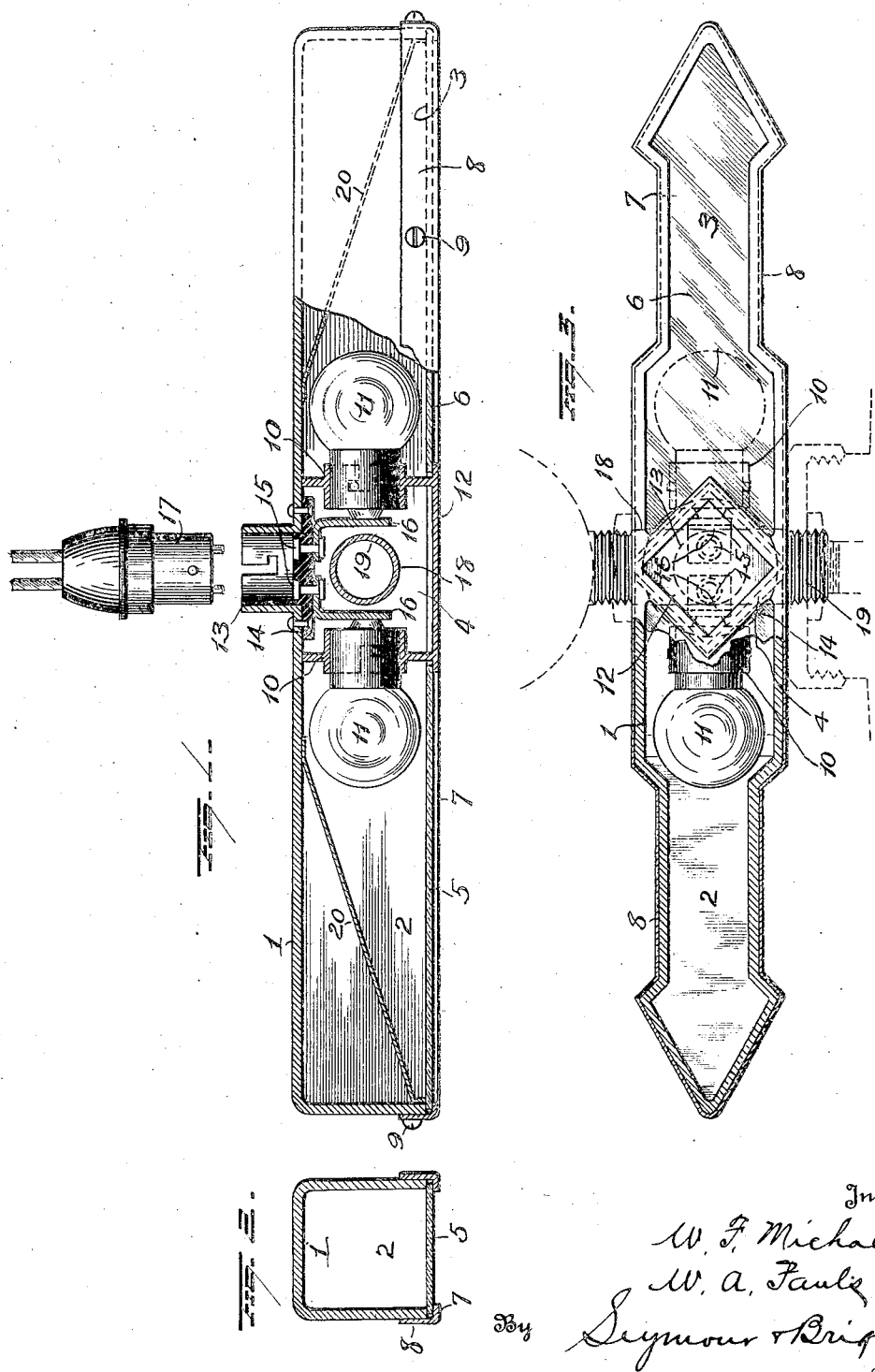

1,571,861

UNITED STATES PATENT OFFICE.

WILLIAM F. MICHAEL AND WALTER A. PAULS, OF BENTON HARBOR, MICHIGAN.

AUTOMOBILE SIGNAL.

Application filed January 24, 1924. Serial No. 688,301.

*To all whom it may concern:*

Be it known that we, WILLIAM F. MICHAEL and WALTER A. PAULS, citizens of the United States, and residents of Benton Harbor, in the county of Berrien and State of Michigan, have invented certain new and useful Improvements in Automobile Signals; and we do hereby declare the following to be a full, clear, and exact description of the invention, such as will enable others skilled in the art to which it appertains to make and use the same.

This invention relates to improvements in automobile signals and more particularly to a direction signal adaptable for use at the front end of an automobile over the radiator.

The object of our present invention is to provide a simple front signal for an automobile to indicate direction and adapted to be secured in position at the front end of an automobile radiator where the radiator cap is located.

With this and other objects in view, the invention consists in certain novel features of construction and combinations of parts as hereinafter set forth and pointed out in the claim.

In the accompanying drawings,—

Figure 1 is a view partly in section illustrating our improvements.

Figure 2 is a transverse sectional view.

Figure 3 is a front view.

Our improved signal structure includes a rectangular casing 1 which may be cast (or it may be constructed of sheet metal pressed into shape if desired) and its shape is such as to provide two arrow shaped portions 2—3 and an intermediate portion 4. The free edge of the frame 1 provides flat faces which receive glass or other transparent plates 5—6 which may be suitably colored to indicate directions. The transparent plates are held in place by means of a front skeleton frame 7 corresponding in contour to that of the main frame or casing 1 and provided with flanges 8 which embrace said main frame or casing and secured thereto by screws 9 or other suitable fastening means. The front frame 7 has rigid therewith, two sleeves 10—10 which, when the front frame is in place, are disposed within the casing 1 and serve to receive the socket portions of incandescent lamps 11 for illuminating the arrow shaped direction indicating portions of the structure.

The intermediate portion of the front frame may be made solid as indicated at 12 and thus provide a plate on which a monogram or other insignia may be embossed or otherwise produced.

The back of the main casing or frame 1 is provided with a collar or socket member 13 to receive a connecting plug of the two-terminal type. The opening of the socket member 13 into the casing 1 is closed by a block or plate 14 of insulating material which has secured thereto by means of pins or bolts 15, contact fingers 16 which engage terminals of the respective signal lamps 11,—said pins or bolts serving as contact members for the terminals of the two-way plug 17.

The casing or frame 1 is provided with an opening 18 to facilitate the insertion of a fastening member 19 whereby the casing may be secured to the radiator at the cap thereof.

If desired, a reflector 20 may be located within each arrow shaped portion of the frame or casing 1.

It will be understood that a suitable switch will be included in circuit with the signal lamps and conveniently located to be manipulated by the driver.

Having fully described our invention what we claim as new and desire to secure by Letters-Patent, is:—

A direction indicator comprising a casing having a socket on its rear wall, an insulating block secured across said socket, conductor elements extending through said block, contact fingers secured to said elements and projecting forwardly in the casing, a front plate for the casing, and webs projecting rearwardly from the front plate and formed with sleeves disposed longitudinally of the casing to support electric lamps in electrical engagement with the contact fingers.

In testimony whereof, we have signed this specification.

WILLIAM F. MICHAEL.
WALTER A. PAULS.